June 9, 1959  J. F. PAULUCCI  2,889,924
FROZEN FOOD PACKAGE DISPLAY RACK
Filed May 9, 1957
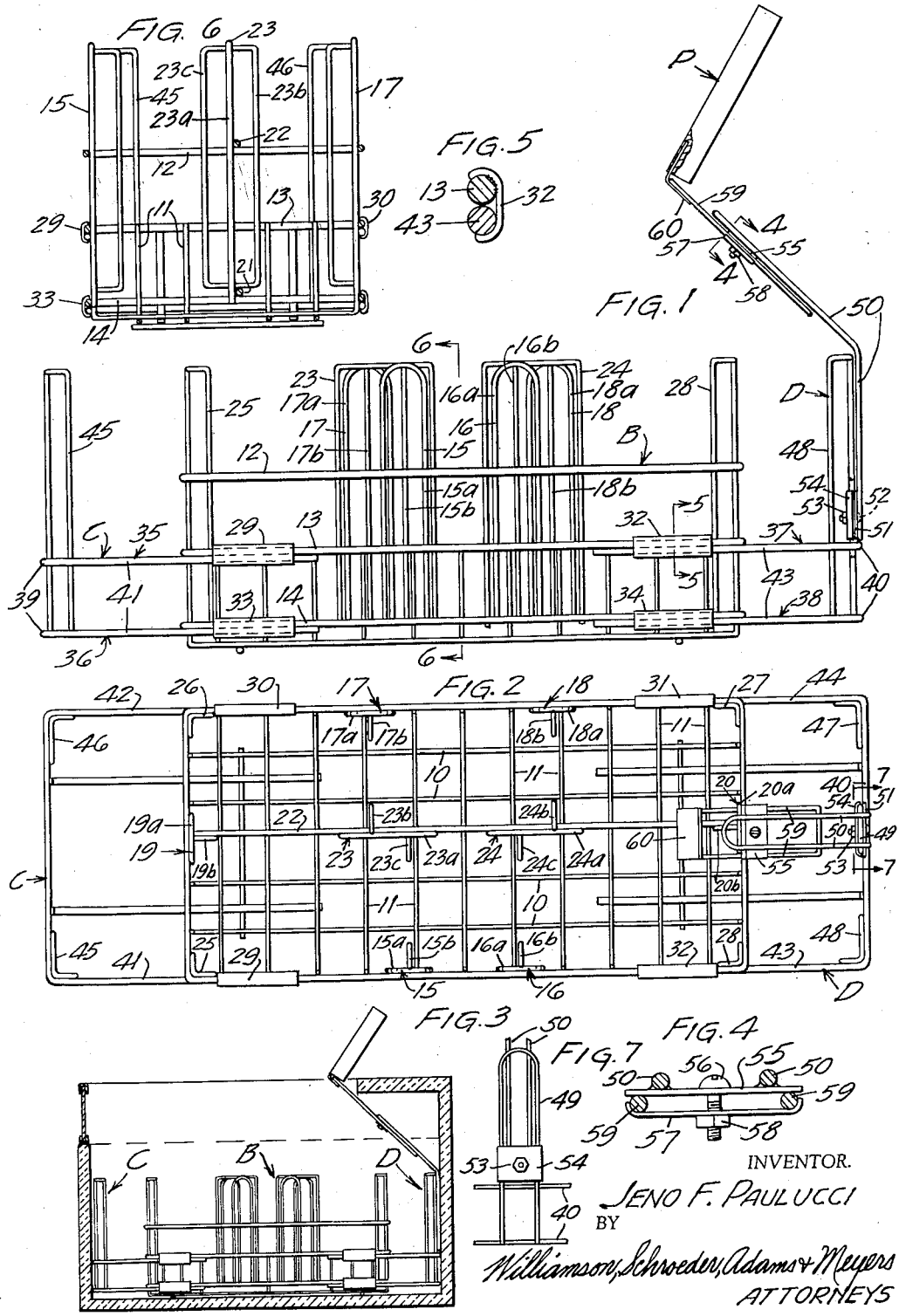
INVENTOR.
JENO F. PAULUCCI
BY
Williamson, Schroeder, Adams & Meyers
ATTORNEYS

United States Patent Office 2,889,924
Patented June 9, 1959

2,889,924

FROZEN FOOD PACKAGE DISPLAY RACK

Jeno F. Paulucci, Duluth, Minn.

Application May 9, 1957, Serial No. 658,102

12 Claims. (Cl. 206—77)

This invention relates to display racks. More particularly it relates to display racks for use within frozen food cabinets for the purpose of holding the packages of various frozen food items in aligned stacks within such a cabinet and for more effectively presenting the packages to the view of the prospective purchaser.

Grocery store owners, and especially the operators of super markets, have found that the display and arrangement of the various packaged frozen foods presents an annoying and ever present problem. This is true because the frozen food packages must be stored continuously within a frozen food cabinet wherein the temperature is always maintained below a prescribed level for if the various foods are permitted to thaw partially, they cannot be refrozen and safely used for human consumption. The frozen food market has developed very rapidly with the result that there are now many different foods offered for sale as well as many different manufacturers of the same frozen food products. It has been found most convenient to stack a particular frozen food manufactured by a particular manufacturer in a single vertical stack, the various different products being stacked side by side in separate stacks within the cabinet. This presents a problem, however, for one stack is frequently used more rapidly than another because that particular frozen food may be more desirable or because the manufacturer of that particular food has established a reputation for excellence in its foods. When this takes place one or more stacks are frequently tipped with the result that the whole interior of the cabinet becomes disarranged. Moreover, housewives have found through long experience that by digging beneath the top item they may find a particular food or a package marketed by a particular manufacturer which is not apparent from mere visual inspection of the contents of the cabinet. As a result, they frequently disarrange stacks which are properly aligned and have a single product manufactured by a single manufacturer therein, while searching for a particular product or name brand and as a result thereof, the whole interior of the cabinet becomes disarranged. Market operators find that a great deal of time and effort is required to almost continuously rearrange the contents of the food cabinet and that during busy periods it is almost an absolute impossibility to keep the interior of such a cabinet in any semblance of order.

In addition to the above, many such frozen food cabinets are of various different sizes and have the upper portion of their rear wall extending forwardly so that it is very difficult to properly display the items in the rearward stack for the upper portion of the rear wall tends to overhang these products and prevents the manufacturer from obtaining the full benefit of the art work and other advertising material contained on the wrapper or label of his package. Many manufacturers spend thousands of dollars in designing and producing a particular package dress and design only to have it nullified or wasted because the package is relegated to a rearward position within such a frozen food cabinet, with the result that the prospective purchaser will not notice it as readily as if it were positioned more forwardly. Also, many frozen food cabinets differ in horizontal depth and since packages vary in size often there is space wasted within which it is impossible to neatly stack frozen food items.

In addition, the prospective purchaser must look directly downwardly on these packages in order to get the full impact of the art work and design of such frozen food packages. Since the casual purchaser does not do this, the manufacturer does not reap the full benefits from his expenditures for advertising, art work, package dress, and design. In order to gain such benefits the most desirable view of the package should be presented in a plane, normal to the line of vision of the prospective purchaser and this is not possible when the frozen food packages are stacked in vertical stacks or piles. My invention is designed to eliminate or at least substantially reduce these disadvantages.

It is a general object of my invention to provide a novel and improved display rack for frozen food products.

A more specific object is to provide a novel and improved display rack for use in a frozen food cabinet which will maintain the various stacks of food in aligned stacks, discourage prospective purchasers from disarranging the aligned stock of frozen food packages, and more effectively display a particular frozen food package to which it is desired to direct the attention of the prospective purchaser.

Another object is to provide a novel and improved display rack of simple and inexpensive construction of the class described which is readily adapted for utilization in frozen food cabinets of various sizes and especially those in which the horizontal depth differs.

Another object is to provide a novel and improved display rack for frozen food packages which will display the frozen food product to which it is desired to direct attention in the most effective manner to a casual purchaser.

Another object is to provide a novel and improved display rack for frozen food packages which will maintain the various stacks of food in aligned stacks, will discourage prospective purchasers from disarranging the aligned stacks, and will more effectively display a particular frozen food package to which it is desired to direct attention even though the frozen food cabinet may have a rear wall which extends forwardly in an overhanging relation to the frozen food products adjacent the lower portions of the cabinet.

Another object is to provide a novel and improved display rack for frozen food packages which will maintain the various stacks of frozen foods in stock in aligned stacks and can be adjusted in size to readily and effectively receive and hold additional packages of food products in aligned stacks when the size of the frozen food cabinet permits.

Another object is to provide a novel and improved display rack for frozen food packages which can be refilled without interrupting the use of the frozen food cabinet as a marketing device.

These and other objects and advantages of my invention will more fully appear from the following description, made in connection with the accompanying drawings, wherein like reference characters refer to the same or similar parts throughout the several views, and in which:

Fig. 1 is a side elevational view of the preferred embodiment of my invention;

Fig. 2 is a top plan view of the same;

Fig. 3 is a diagrammatic illustrative view showing how the display rack functions to display a package more effectively in a frozen food cabinet which has an overhanging rear wall portion;

Fig. 4 is a fragmentary sectional view taken along line 4—4 of Fig. 1;

Fig. 5 is a fragmentary sectional view taken along line 5—5 of Fig. 1; and

Fig. 6 is a cross-sectional view taken along line 6—6 of Fig. 1.

As shown in Figs. 1–6, my display rack consists of an elongated rectangularly shaped metal rod framework 10 which comprises a basket indicated generally as B. This basket B as shown has a metal wire bottom of latticework type which includes a plurality of longitudinally extending wires 10 and transversely extending wires 11 at the bottom thereof. The framework includes as shown three vertically spaced rectangularly shaped metal rod rings 12, 13, and 14. These rings 12, 13, and 14 are connected at each side by a pair of longitudinally spaced upright partition members 15, 16, 17, and 18. Each of these partition members is comprised of a U-shaped member such as 15a and a transversely extending dividing rod such as 15b. The corresponding members have been designated by the numerals 16a, 17a, 18a, and 16b, 17b and 18b. By reference to Fig. 2 it can be seen that the partition members 15 and 17 are not directly opposed nor are the partition members 16 and 18 positioned directly opposite each other.

Secured to each end portion of the rings 12—14 is one of a pair of partition members 19 and 20. Each of these partition members 19 and 20 is constructed similar to the partition members 15—18 except that the rods 19b and 20b are connected to a rod 21 which runs longitudinally of the rings and is welded to the bottom ring 14. A second rod 22 is welded to the rods 19b and 20b at approximately the level of the top ring 14. Welded to the vertically spaced rods 21 and 22 is a pair of upright partition members 23 and 24 which are spaced longitudinally of the basket or framework. Each of these partition members is comprised of an inverted U-shaped member such as 23a, 24a which is welded to the two rods 21 and 22 and a pair of laterally extending divider rods such as 23b, 23c and 24b, 24c. It will be noted that the rods 23b and 23c are not oppositely disposed and that the dividing rods 24b and 24c are also not oppositely disposed. These upright partition members 23 and 24 together with the partition members 15, 16, 17, and 18 and the corner members to be hereinafter described define upright compartments for holding the frozen food packages of various sizes in vertically aligned relation.

At each corner of the rings 12, 13, and 14 is one of four upright corner members 25, 26, 27, and 28. Each of these corner members is of an inverted U-shape with one leg secured to the side of the ring and the other leg secured to the end of the ring adjacent the angles thereof so that one of the legs is offset longitudinally of the ring relative to its other leg. As previously recited these corner members help to keep the packages of frozen food aligned.

Secured to each side of the framework adjacent each end thereof, is a pair of vertically spaced channel members such as the channel members 29, 30, 31, 32, 33, and 34. The channel members 29—32 are each welded to ring 13 and the channel members 33—34 are each welded to the bottom ring 14. The other two channel members which are not shown and are on the side opposite to the side carrying the channel members 33—34 are also welded to the bottom ring 14.

Slidably mounted in these channel members at each end is a horizontally extending U-shaped member indicated generally as C and D. The U-shaped member C consists of a pair of U-shaped rods 35 and 36 while the U-shaped member D consists of a pair of U-shaped rods 37 and 38. The U-shaped member C has a base portion 39 and the U-shaped member D has a base portion indicated by the numeral 40. The U-shaped member C has leg portions 41 and 42 while the U-shaped member D has leg portions indicated by the numerals 43 and 44.

Secured to the U-shaped members C and D are corner members 45, 46, and 47, 48, respectively. Each of these corner members is connected to the base portion and leg portion of its U-shaped member with its portion connected to the side of the U-shaped member being longitudinally offset from its portion which is connected to the base portion of its U-shaped member.

Secured to the base portion of the U-shaped member D which in use is at the back end of the display rack is an upright member 49. This member 49 is an inverted U-shaped loop welded to the base portion 40 of the U-shaped member D midway between the ends of that portion. Secured to the upright member 49 is a display arm A which consists of an inverted U-shaped member 50, the ends of which are connected by a plate 51 which has a bolt 52 bearing a nut 53 extending therethrough. A cooperating clamping plate 54 is also pierced by the bolt 52 and is held in clamping relation by the nut 53. The member 50 extends upwardly above the upright member 49 and then forwardly and upwardly away from the base portion 40 of the U-shaped member D toward the adjacent end of the framework. The clamping plate 54 in cooperation with the plate 51, the bolt 52 and the nut 53, rigidly and adjustably secure the U-shaped member 50 to the upright member 49 and permit the U-shaped member 50 to be adjusted vertically relative to the upright member.

The upper end of the member 50 is provided with a plate 55 which is welded thereto and has a bolt 56 extending therethrough. This bolt 56 also extends through a clamping plate 57 which is secured by the nut 58 carried by the bolt 56. The clamping plate 57 is welded to a U-shaped display member 59 which in turn has an angulated plate member 60 welded to its upper end. The plate member 60 is bent upwardly at its upper end and rearwardly toward the base portion 40. This plate member 60 is narrower than the conventional package which will be displayed so that it may readily be inserted into the interior of such a package.

In use the various vertical compartments defined by the partitions 15, 16, 17, 18, 23, and 24 are utilized by placing the frozen food packages which come closest to their size in a horizontal plane therein. If the frozen food cabinet is of a horizontal depth equal to the length of the framework or basket defined by the rings 12, 13, and 14, the U-shaped members C and D are pushed toward each other as far as they can be so moved so that they abut against the end portions of the basket. In this manner they are moved to an out-of-way position. If however, the frozen food cabinet is of a horizontal depth greater than the length of the basket B, either the forward U-shaped member C or the rearward U-shaped member D may be pulled outwardly away from the adjacent end of the basket B to provide space between the end structure of the basket B and the base portion of the U-shaped member to accommodate additional packages of frozen food therebetween. If the U-shaped portion D is pulled outwardly, this member with its upstanding corner members 47 and 48 will maintain the packages of frozen food in aligned position. The same function will be performed by the U-shaped member C with its corresponding elements if that member is pulled outwardly to the position shown in Fig. 1 and Fig. 2. It will be noted that each of these U-shaped members can be moved toward each other until the base portion of the U-shaped members lies directly outside the end structure of the basket B.

With the packages of frozen food stacked in vertical stacks and each individual package extending horizontally between the partition members 15—18 and 23—24 and the corner members 25—28 and 45—48, it is extremely difficult for a prospective purchaser to disarrange the portion of the frozen food cabinet which is held in aligned relation by my display rack. This display rack certainly tends to discourage a rummaging housewife from completely disarranging the portion of the interior of the frozen food cabinet which is held in aligned relation by my display rack.

Figs. 1 and 3 show how a sample package of the frozen food products being offered for sale can be more effectively displayed through the use of my display rack. To accomplish this display the package P has a slit made in the side wall thereof at a centrally disposed position comparable in length to the width of the plate 60. This slit is made immediately adjacent and parallel to the face of the package so that when the upwardly extending portion of the plate 60 is inserted in the slit, the upwardly extending portion of the plate 60 will bear against the back of the face of the package while the lower side wall of the package as shown in Figs. 1–3 will rest upon the upper end portion of the member 59. It will be readily appreciated that when a package is so displayed it is placed in a plane substantially normal to the line of vision of the casual purchaser as he saunters by the frozen food cabinet. In this manner it is possible for the manufacturer to reap the fullest benefits of the expenditures which he has made in designing the particular package in which his frozen foods are being marketed. The full impact of the art work and the package dress and design is received by the casual purchaser. This is in sharp contrast to the impression which the casual purchaser gets as he walks by a display of frozen food packages, the art work of which extends in a horizontal plane for in such an arrangement the casual purchaser obtains only a blurred impression of what is being offered for sale.

It should also be noted that my display rack is particularly well designed for use in conjunction with frozen food cabinets which have a rear wall portion that extends upwardly and then forwardly as illustrated in Fig. 3. Under such conditions my display arm very effectively presents the item which is most desired to be brought to the attention of the prospective purchaser. Without the angulated display arm the items at the rear of the frozen food cabinet would in all probability escape the attention of the casual purchaser whereas through the use of this display arm the purchaser receives the full impact of the appetizing displays which are presented by the manufacturer in the art work and package design contained in the product which he is marketing.

Another advantage of my display rack is that the entire rack may be removed and refilled without interrupting the use of the frozen food cabinets as a marketing device. Without using my display rack the market operator or his help must stand before the frozen food cabinet and stack the respective items in the desired location until the stock has been replenished. In order to accomplish this he normally must have a cart of some type upon which he transports the frozen articles and he parks this beside the frozen food cabinet while he stands beside the cart and replenishes the stock. This interrupts the use of the frozen food cabinet as a marketing device and prevents the purchaser from gaining access to at least a substantial portion of the frozen food cabinet. When my display rack is removed bodily and refilled at a location apart from the frozen food cabinet, this interruption of use of the frozen food cabinet as a marketing device no longer occurs.

Another advantage of my display rack is that the adjustable U-shaped members at each end of the basket can be moved inwardly or outwardly away from the basket so as to fit frozen packages of any desired size. Therefore, if a manufacturer has a frozen food package which is not of the conventional size, it can be readily stacked at either end of the basket B and snugly held in vertical alignment as desired.

It will, of course, be understood that various changes may be made in the form, details, arrangement and proportions of the parts without departing from the scope of my invention which consists of the matter shown and described herein and set forth in the appended claims.

What I claim is:

1. A display rack for displaying frozen packaged foods in a neat and orderly manner within a frozen food cabinet comprising, an elongated metal framework basket having a plurality of vertically extending partition members therewithin extending upwardly from the central portions thereof to an elevation above said basket and dividing the interior thereof into a plurality of package-holding vertically extending compartments, and having vertically extending end members at the ends thereof, and a U-shaped member slidably carried by one end portion of said basket, the legs of said U-shaped member extending horizontally along the sides of said basket and being slidable therealong in a horizontal plane, the base portion of said U-shaped member extending in a vertical plane transversely of said basket outside the confines thereof and being movable toward and away from said basket when the legs of said member are slid relative to the sides of said basket whereby said member may function in combination with said end members as an extension of said basket and said basket may be thereby adapted to properly fit frozen food cabinets of various sizes.

2. A display rack for displaying frozen packaged foods in a neat and orderly manner within a frozen food cabinet comprising, an elongated basket having opposite sides and vertically extending end members at one end portion thereof, a plurality of angulated vertically extending partition members carried by said basket and extending upwardly from the central portions thereof and dividing the interior thereof into a plurality of vertically extending package-holding compartments, and a U-shaped member slidably carried by said end portion of said basket, the legs of said U-shaped member extending horizontally along the sides of said basket and being slidable therealong in a horizontal plane, the base portion of said U-shaped member extending in a vertical plane transversely of said basket outside the confines thereof and being movable toward and away from said basket when the legs of said members are slid relative to the sides of said basket whereby said member may function in combination with said end members as an extension of said basket and the rack may be thereby adapted to properly fit frozen food cabinets of various sizes.

3. A display rack for displaying frozen packaged foods in a neat and orderly manner within a frozen food cabinet comprising, an elongated rectangularly shaped framework having opposed vertically extending sides and opposed vertically extending ends, a plurality of vertically extending angulated partition members carried by said framework and extending upwardly from the central portions thereof and dividing the interior thereof into a plurality of vertically extending package-holding compartments, and a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes.

4. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, each of said legs defining an angle with said base portion of said U-shaped member, a rigid upstanding member carried by each of said legs adjacent said base portion, and a rigid upstanding member carried by said base portion adjacent the apex of each of said angles, said upstanding members cooperatively forming upstanding alignment members for aligning food packages placed between said end portion and said base portion of said U-shaped member.

5. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, an upstanding member carried by said base portion intermediate its ends and extending upwardly therefrom, and an arm secured to said upstanding member and extending upwardly and forwardly therefrom toward said end portion of said framework, said arm having a free end portion adapted to engage and support in elevated relation to said framework a sample package of the packages to be displayed within the rack.

6. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, an upstanding member mounted on said base portion intermediate its ends and extending upwardly therefrom, and an arm secured to said upstanding member and extending upwardly and forwardly therefrom toward said end portion of said framework, said arm being longitudinally extensible and having a free end portion adapted to engage and support in elevated relation to said framework a sample package of the packages to be displayed within the rack.

7. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidable there along in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, an upstanding member mounted on said base portion intermediate its ends and extending upwardly therefrom, an arm secured to said upstanding member and extending upwardly and forwardly therefrom toward said end portion of said framework, said arm having a free end portion in elevated overhanging relation to said framework, and a plate member secured to said free end portion of said arm and extending at an angle thereto upwardly and rearwardly therefrom, the upwardly extending portion of said plate member being adapted to be inserted into the side wall of a sample package immediately adjacent the face wall of the package to bear against the back of the latter and support the same on display in an effective manner.

8. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidably therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, and a pair of channel members one each of which is secured to each of the sides of said framework and within which one leg portion of said U-shaped member slides, said channel member securing said U-shaped member to said framework and guiding the same during its sliding movement relative to said framework.

9. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes, and an arm supported by said base portion in elevated relation to said framework and extending upwardly and forwardly relative thereto, said arm being vertically adjustable relative to said base portion and being extensible longitudinally of said framework, said arm having a free end portion adapted to engage and support in elevated relation to said framework a sample package of the packages to be displayed within the rack.

10. A display rack for displaying frozen packaged foods in a neat and orderly manner within a frozen food cabinet comprising, an elongated rectangularly shaped framework having opposed vertically extending sides and opposed vertically extending ends, a plurality of vertically extending partition members carried by said framework and dividing the interior thereof into a plurality of vertically extending package-holding compartments, said framework being comprised of metal rods and provided with a wire latticework bottom, and a U-shaped member slidably carried by one end portion of said framework, the legs of said U-shaped member extending horizontally along the sides of said framework and being slidable therealong in a horizontal plane, said U-shaped member having a base portion connecting the legs thereof and extending in a vertical plane transversely of said framework, and being movable toward and away from said framework when the legs of said member are slid relative to the sides of said framework whereby said member may function in combination with said end portion of said framework as an extension of said framework and the rack may thereby be adapted to properly fit frozen food cabinets of various sizes.

11. A display rack for displaying frozen packaged foods in a neat and orderly manner within a frozen food cabinet comprising, an elongated basket having opposite sides and end portions and vertically extending end members at one end portion thereof, a plurality of vertically extending partition members carried by said basket and dividing the interior thereof into a plurality of vertically extending package-holding compartments, a U-shaped member slidably carried by said end portion of said basket, the legs of said U-shaped member extending horizontally along the sides of said basket and being slidable therealong in a horizontal plane, the base portion of said U-shaped member extending in a vertical plane transversely of said basket outside the confines thereof and being movable toward and away from said basket when the legs of said members are slid relative to the sides of said basket whereby said member may function in combination with said end members as an extension of said basket and the rack may be thereby adapted to properly fit frozen food cabinets of various sizes, said base portion constituting an end portion for the basket when the latter is extended, an upstanding member carried by one of said end portions and extending upwardly therefrom, and an arm secured to said upstanding member and extending upwardly and forwardly therefrom toward said end members of said basket, said arm having a free end portion adapted to engage and support in elevated relation to said basket a sample package of the packages to be displayed within the rack.

12. A display rack for displaying frozen packaged foods in a neat and orderly manner within a frozen food cabinet comprising, an elongated basket having opposite sides and vertically extending end members at one end portion thereof, a plurality of vertically extending partition members carried by said basket and dividing the interior thereof into a plurality of vertically extending package-holding compartments, a U-shaped member slidably carried by said end portion of said basket, the legs of said U-shaped member extending horizontally along the sides of said basket and being slidable therealong in a horizontal plane, the base portion of said U-shaped member extending in a vertical plane transversely of said basket outside the confines thereof and being movable toward and away from said basket when the legs of said members are slid relative to the sides of said basket whereby said member may function in combination with said end members as an extension of said basket and the rack may be thereby adapted to properly fit frozen food cabinets of various sizes, and a pair of channel members one each of which is secured to each of the sides of said basket and within which one leg portion of said U-shaped members slides, said channel member securing said U-shaped member to said basket and guiding the same during its sliding movement relative to said basket.

References Cited in the file of this patent

UNITED STATES PATENTS

| | | |
|---|---|---|
| 779,262 | Burke | Jan. 3, 1905 |
| 1,535,077 | Miller | Apr. 21, 1925 |
| 1,907,630 | Ward | May 9, 1933 |
| 2,163,865 | Bitney | June 27, 1939 |
| 2,641,396 | Parr | June 9, 1953 |
| 2,799,424 | Good | July 16, 1957 |